(12) United States Patent
Hata

(10) Patent No.: US 8,647,455 B2
(45) Date of Patent: Feb. 11, 2014

(54) PROCESS FOR MANUFACTURING PNEUMATIC TIRE

(75) Inventor: Hiroshi Hata, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 792 days.

(21) Appl. No.: 12/293,495

(22) PCT Filed: Apr. 2, 2007

(86) PCT No.: PCT/JP2007/057407
§ 371 (c)(1),
(2), (4) Date: Sep. 18, 2008

(87) PCT Pub. No.: WO2007/116860
PCT Pub. Date: Oct. 18, 2007

(65) Prior Publication Data
US 2009/0272485 A1 Nov. 5, 2009

(30) Foreign Application Priority Data
Apr. 3, 2006 (JP) .................................. 2006-101494

(51) Int. Cl.
*B29D 30/30* (2006.01)
*B60C 5/14* (2006.01)

(52) U.S. Cl.
USPC ........ 156/133; 152/510; 156/126; 156/130.3; 156/134

(58) Field of Classification Search
USPC ........ 156/123, 126, 130.3, 133, 134; 152/510
See application file for complete search history.

(56) References Cited

U.S. PATENT DOCUMENTS

| | | | |
|---|---|---|---|
| 5,938,869 A | 8/1999 | Kaido et al. | |
| 6,062,283 A * | 5/2000 | Watanabe et al. | 152/510 |
| 2002/0153083 A1 * | 10/2002 | Takagi | 156/121 |
| 2006/0042740 A1 * | 3/2006 | Takahashi et al. | 152/510 |
| 2006/0048873 A1 * | 3/2006 | Kudo et al. | 152/209.1 |

FOREIGN PATENT DOCUMENTS

| | | | |
|---|---|---|---|
| EP | 1625931 A1 * | 2/2006 | |
| FR | 2299978 A * | 10/1976 | |
| JP | A 8-258506 | 10/1996 | |
| JP | A 2000-272023 | 10/2000 | |
| JP | 2002-18973 A * | 1/2002 | |

* cited by examiner

*Primary Examiner* — Geoffrey L Knable
(74) *Attorney, Agent, or Firm* — Greer Burns & Crain, Ltd.

(57) ABSTRACT

Provided is a process of manufacturing a pneumatic tire, which prevents blisters from being raised on a cylindrical thermoplastic resin film due to an air pocket even in a case where the cylindrical thermoplastic resin film is used as an air permeation preventive layer. Provided is the manufacturing process suitable for a heavy-duty pneumatic tire in particular. The process of manufacturing a pneumatic tire includes: covering the making drum 20 with a cylindrical thermoplastic resin film 6; winding an uncured rubber sheet member 7 as a tie rubber around the thermoplastic resin film 6; and winding a carcass layer 5 around the rubber sheet member 7. The process is characterized in that the rubber sheet member 7 is wound in the circumferential direction of the tire at least twice.

8 Claims, 5 Drawing Sheets

Fig.5
(A)
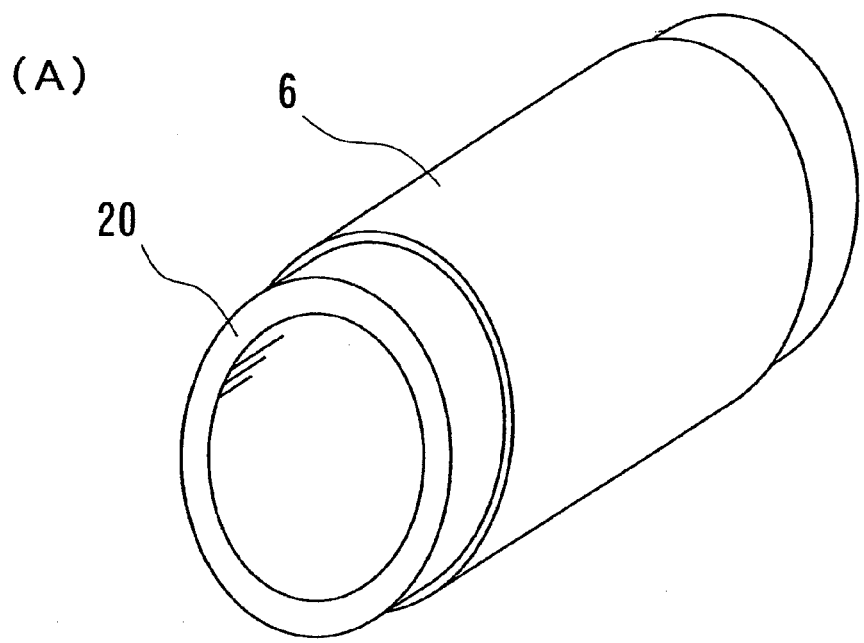
(B)
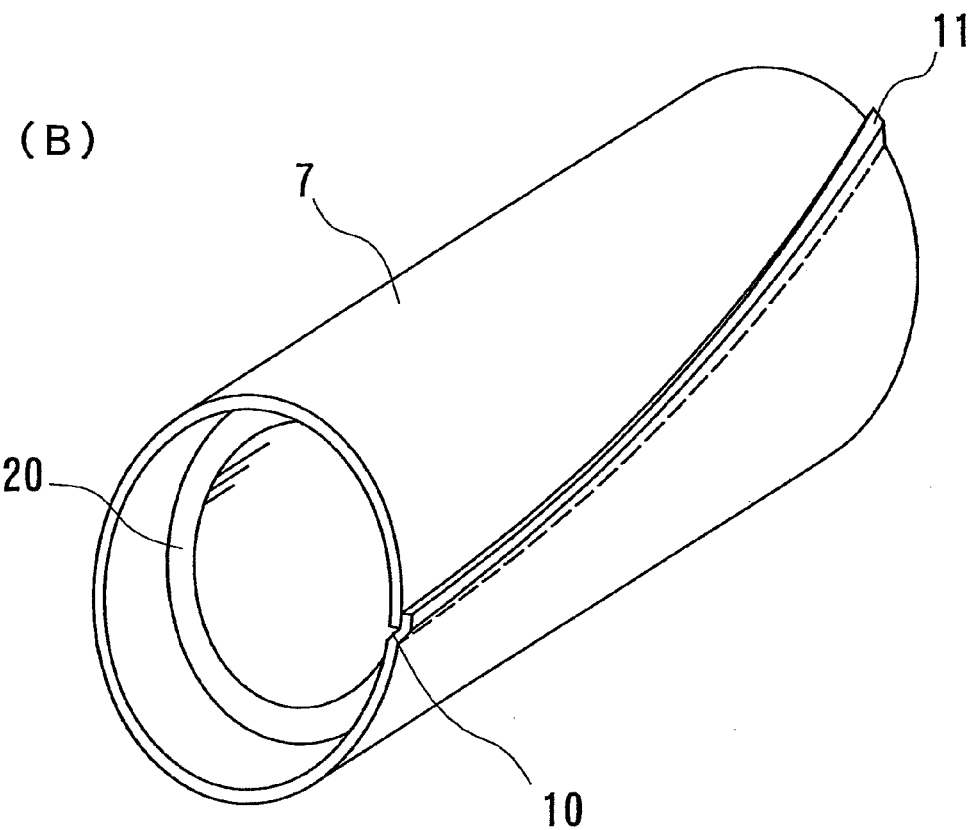

US 8,647,455 B2

PROCESS FOR MANUFACTURING PNEUMATIC TIRE

This application is a U.S. National Phase under 35 U.S.C. §371 of International Application No. PCT/JP2007/057407, filed Apr. 2, 2007.

TECHNICAL FIELD

The present invention relates to a process of manufacturing a pneumatic tire, and specifically to a process of manufacturing a pneumatic tire, which prevents blisters from being caused on an inner surface of a cylindrical thermoplastic resin film when the cylindrical thermoplastic resin film is used as an air permeation preventive layer. Particularly, the present invention relates to a process of manufacturing a pneumatic tire, which is suitable for manufacturing a heavy-duty tire.

BACKGROUND ART

The inner surface of a tubeless pneumatic tire is integrally lined with an air permeation preventive layer (or an inner liner). A butyl rubber exhibiting a better impermeability is used as a material for the air permeation preventive layer. Despite a recent growing demand for light-weight pneumatic tires, the large specific gravity of the butyl rubber has made it difficult to achieve light-weight pneumatic tires. With this taken into consideration, Patent Document 1 has proposed that, instead of the butyl rubber, a thermoplastic resin film with a small specific gravity be used as the air permeation preventive layer, and makes it possible to manufacture light-weight tires.

Unlike the butyl rubber, however, the thermoplastic resin film has no air absorption property. This brings about a problem that, if the air is trapped in the thermoplastic resin film while an uncured tire is made, the trapped air causes blisters on the inner surface of the thermoplastic resin film after the tire is cured.

When a pre-cured green tire is made, first of all, a making drum 20 is covered with a cylindrical thermoplastic resin film 6, as shown in FIG. 5(A). Subsequently, as shown in FIG. 5(B), an uncured rubber sheet member 7 as a tie rubber is wound around the thermoplastic resin film 6 once. Thereafter, the two end portions of the uncured rubber sheet member 7 are spliced together with an overlap, and a step-shaped splice part 11 is thus formed. In this step-shaped splice part 11, as shown in FIG. 6, an air pocket 10 with a triangular cross-section is formed between the uncured rubber sheet member 7 and the thermoplastic resin film 6. After a green tire is made by laminating a carcass layer 5 to the uncured rubber sheet member 7 thus spliced, if the green tire thus made is molded by curing, blisters are caused on the tire because the air pocket 10 is not fully absorbed in the rubber layer. It is likely that the blisters may not only damage the aesthetic appearance of the inner surface of the tire, but also present a cause of breaking the thermoplastic resin film or separating the thermoplastic resin film therefrom while in use.

Particularly in the case of tires of a type in which, like heavy-duty tires, a ratio of carcass lift caused during a curing treatment is large so that carcass cords constituting the carcass layer are likely to bite into the inner liner, a rubber sheet member has to be formed thicker for the purpose of preventing the carcass cords from biting into the inner liner. This presents a problem that the foregoing problem is more likely to occur.

Patent Document 1: Japanese Patent Application Publication No. Hei 8-258506

DISCLOSURE OF THE INVENTION

Problem to be Solved by the Invention

An object of the present invention is to provide a process of manufacturing a pneumatic tire, which prevents blisters from being caused on a cylindrical thermoplastic resin film due to an air pocket even when the cylindrical thermoplastic resin film is used as an air permeation preventive layer, and particularly the manufacturing process which is suitable for a heavy-duty pneumatic tire.

Means for Solving the Problem

A process of manufacturing a pneumatic tire according to the present invention made for the purpose of achieving the object is characterized by including: covering a making drum with a cylindrical thermoplastic resin film; winding an uncured rubber sheet member as a tie rubber around the thermoplastic resin film; and winding a carcass layer around the rubber sheet, the process being characterized in that the rubber sheet member is wound around the thermoplastic resin film in the circumferential direction of the tire at least twice.

Effect of the Invention

The process of manufacturing a pneumatic tire according to the present invention makes it possible to make the thickness of rubber sheet member thinner so that the thickness of the tie rubber layer can be adjusted to be thicker with the number of winding the rubber sheet member, when needed. That is because the rubber sheet member is designed to be wound around the thermoplastic resin material in the circumferential direction of the tire at least twice before the rubber sheet member as the tie rubber is inserted between the thermoplastic resin film and the carcass layer. Accordingly, the process makes it possible to decrease the thickness of the rubber sheet member. In addition, the process makes it possible to decrease the height of the step in the splice part as the rubber sheet member becomes thinner, and thus to reduce the amount of the air enclosed in the green tire, as well as consequently to prevent blisters from being caused thereon.

BRIEF DESCRIPTION OF THE DRAWINGS

FIGS. 5(A) and 5(B) are explanatory perspective views showing a green tire making step using a drum included in a conventional process of manufacturing a heavy-duty pneumatic tire.

Figure 1:
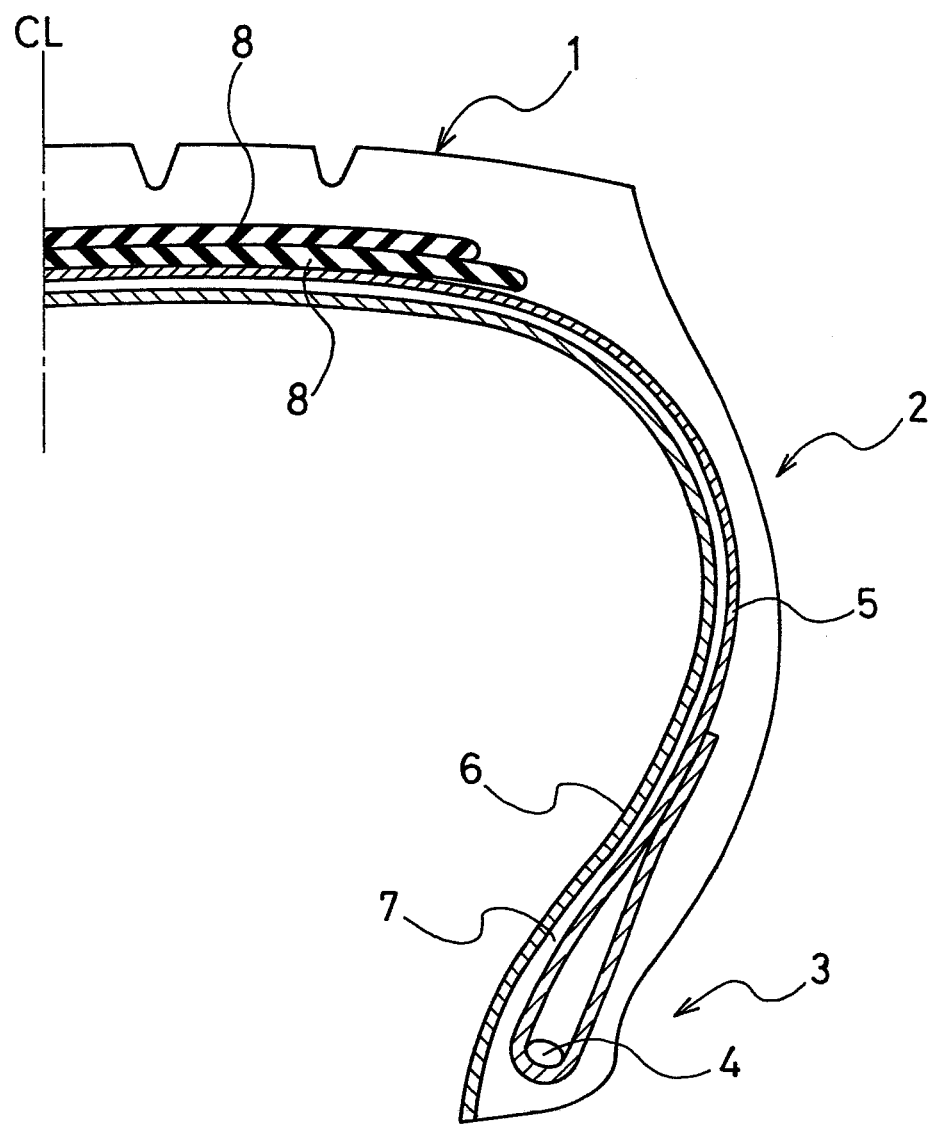
FIG. 1 is a half cross-sectional view of an example of a pneumatic tire according to an embodiment of the present invention which is manufactured in accordance with the present invention, the pneumatic tire being viewed in a meridional direction of the tire.

EXPLANATION OF REFERENCE NUMERALS 5 carcass layer
6 thermoplastic resin film
7 rubber sheet member
10 air pocket
11 splicing part
20 making drum

BEST MODES FOR CARRYING OUT THE INVENTION

FIG. 1 is a half cross-sectional view showing an example of a heavy-duty pneumatic tire according to an embodiment of the present invention, as a pneumatic tire manufactured in accordance with the present invention, the heavy-duty pneumatic tire being viewed in the meridional direction of the tire.

In FIG. 1, reference numeral 1 denotes a tread part; 2, a sidewall part; and 3, a bead part. A carcass layer 5 is laid between paired right and left bead cores 4 respectively embedded in the bead parts 3. The end portions of the carcass layer 5 are folded back around the respective bead cores 4 from inside to outside of the tire. In the tread part 1, paired upper and lower belt layers 8 are arranged outward of the carcass layer 5 in a way that the paired upper and lower belt layers 8 make their respective circuits around the tire. A cylindrical thermoplastic resin film 6 as an air permeation preventive layer is adhered on the innermost surface of the pneumatic tire. A tie rubber, or a rubber sheet member 7, working as an adhesive layer is arranged between the thermoplastic resin film 6 and the carcass layer 5.

When the pre-cured green tire is made in accordance with the current process of manufacturing a pneumatic tire which has the above-described configuration, as described above, a making drum 20 is covered with a cylindrical thermoplastic resin film 6, as shown in FIG. 5(a); and subsequently an uncured rubber sheet member 7 is wound around the thermoplastic resin film 6 in the circumferential direction of the tire, and the two end portions of the rubber sheet member 7 are spliced together with an overlap, as shown in FIG. 5(B). Thereafter, a carcass layer 5 is wound around the outside of this rubber sheet member 7 in a way that the carcass layer 5 makes a circuit around the rubber sheet member 7. After that, the paired right and left bead cores 4 are fitted into the two end portions of the cylindrical carcass layer 5. Subsequently, the two end portions of the carcass layer 5 are folded back around the bead cores 4 in a way that the bead cores 4 are wrapped with the two end portions thereof, respectively. Eventually, a primary green tire is made by laminating a side rubber thereto. Thereafter, the primary green tire is reset on a secondary making drum. Subsequently, the diameter of the primary green tire is expanded in a way that the interval between the paired right and left bead cores 4 is shortened, and a secondary green tire is made by laminating the belt layers 8 and a tread rubber onto the resultant primary green tire. The secondary green tire thus made is inserted in a mold, and is molded by curing.

Figure 6:
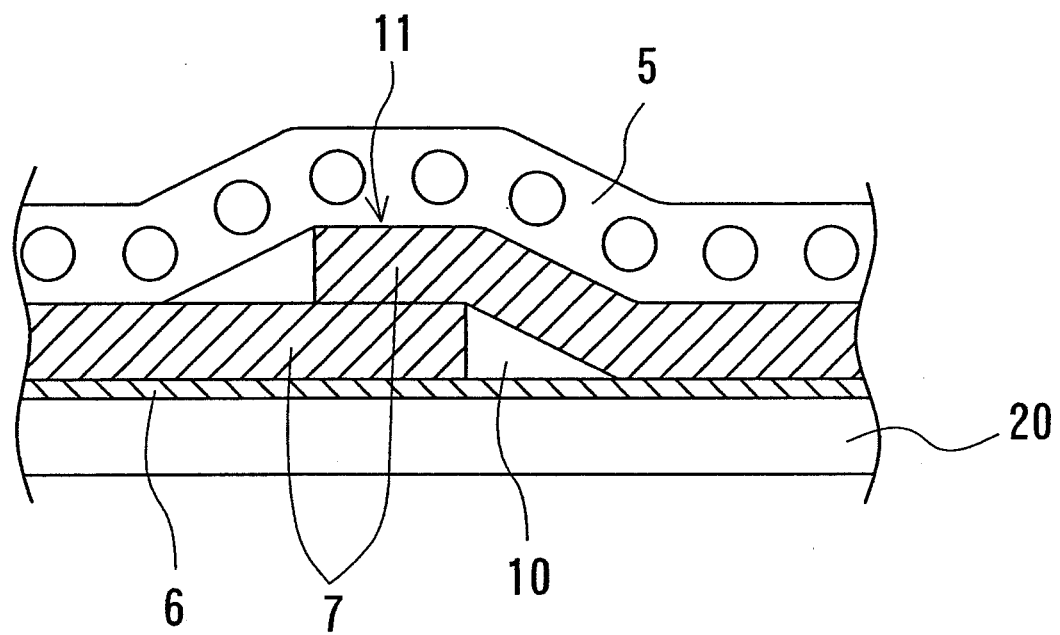
FIG. 6 is a partial magnified cross-sectional view of a splice part formed in a making step using a drum included in a conventional process of manufacturing a pneumatic tire, the splice part being viewed in the axial direction of the drum.

In the case of the current manufacturing process, as described in the section entitled "Background Art," when the rubber sheet member 7 is wound around the thermoplastic resin film 6 in the manner shown in FIG. 6, an air pocket 10 is formed in the step part of a splice part 11. The air enclosed in the air pocket 10 grows inflatedly during the curing process. This inflated growth may cause a problem of blisters, and a problem that, depending on conditions, the air infiltrates thereinto from the air pockets after the secondary green tire is made, so that the thermoplastic resin film comes off after the green tire is left therein for a long time.

Figure 2:
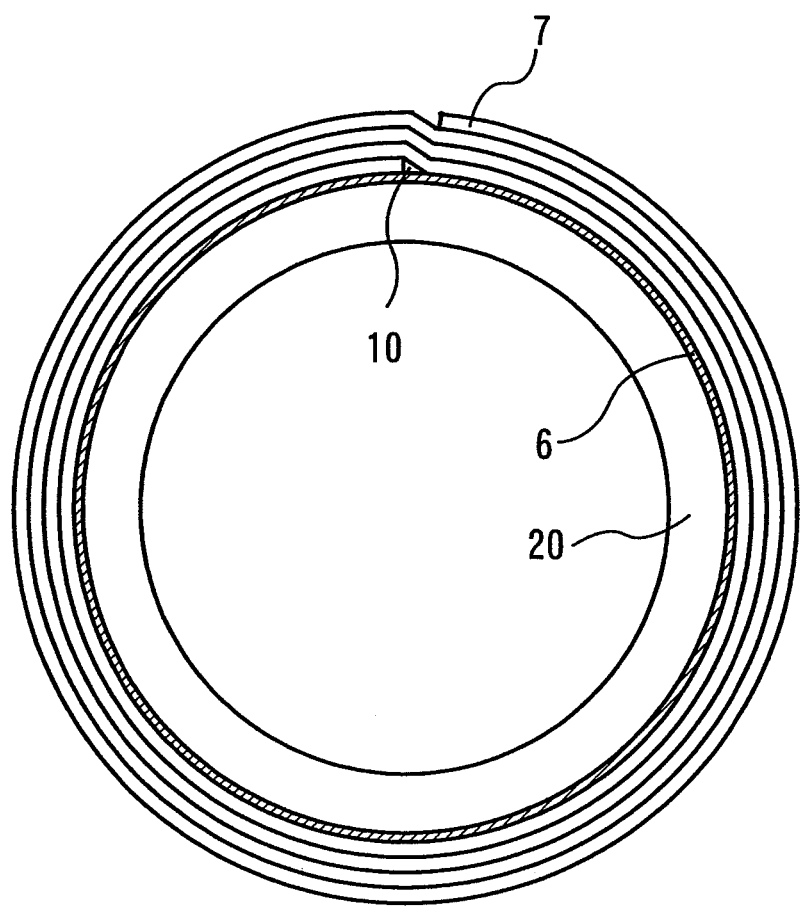
FIG. 2 is an explanatory view showing an example of a making step using a drum included in a process of manufacturing a pneumatic tire according to an embodiment of the present invention, the drum being viewed in the axial direction of the drum.

By contrast, in the case of a manufacturing process according to the present invention, as shown in FIG. 2, a making drum 20 is covered with a cylindrical thermoplastic resin film 6, and a thin rubber sheet member 7 is wound around the thermoplastic resin film 6 at least twice. Thereby, the manufacturing process according to the present invention reduces the size of an air pocket 10 formed adjacent to an end of the rubber sheet member 7 at which the winding starts. Thereby, the amount of the air enclosed in the air pocket is decreased, and as a result, part of the rubber sheet member 7 around the air pocket 10 is enabled to absorb all of the air enclosed in the air pocket 10 while the secondary green tire is molded by curing. Thereby, the manufacturing process according to the present invention is capable of preventing blisters from being caused. In addition, this manufacturing process is capable of preventing the air from infiltrating thereinto after a secondary green tire is made, and thus of preventing the thermoplastic resin film 6 from exfoliating.

The number of winding the rubber sheet member 7 around the thermoplastic resin film 6 is at least twice. It is desirable that the rubber sheet member 7 should be wound around the thermoplastic resin film 6 three to ten times. Winding the rubber sheet member 7 around the thermoplastic resin film 6 at least twice, makes it possible to reduce the sheet thickness of the rubber sheet member 7 to half or less. In other words, this process is capable of reducing the height of the air pocket formed in the end of the rubber sheet member at which the winding starts to a half or less, and thus of reducing the area of the triangular cross-section of the air pocket to a quarter to a half. Thereby, the amount of the air enclosed in the air pocket is decreased to a large extent.

It is desirable that the thickness of the rubber sheet member 7 used in accordance with the manufacturing process of the present invention should be 0.2 mm to 1.0 mm. It is more desirable that the thickness thereof should be 0.4 mm to 0.8 mm. When the thickness of the rubber sheet member 7 is less than 0.2 mm, the number of winding the rubber sheet member 7 should be increased for the purpose of preparing a tie rubber layer with a thickness which is required for the adhesive layer. This increase accordingly makes the air caught between the multiple wound layers of the rubber sheet member 7 easily. When the thickness of the rubber sheet member 7 is more than 1.0 mm, the air pocket 10 formed in the end of the rubber sheet member 7 at which the winding starts is large.

In the case of the manufacturing process according to the present invention, the total thickness of the multiple wound rubber sheet member, or the thickness of the tie rubber, is preferably 0.4 mm to 5.0 mm, and more preferably 0.8 mm to 4.0 mm. When the total thickness of the multiple wound rubber sheet member is less than 0.4 mm, it is likely that the rubber sheet member may be caught in the carcass layer, and that the rubber sheet member accordingly may no longer exert its function as the adhesive layer for adhering the carcass layer and the thermoplastic resin layer. In the case of the heavy-duty tires, this thickness makes it impossible to fully prevent the carcass cords from embedding in the inner liner. On the other hand, when the total thickness of the multiple wound rubber sheet member is more than 5.0 mm, this thickness unfavorably increases the weight of the tire.

Figure 3:
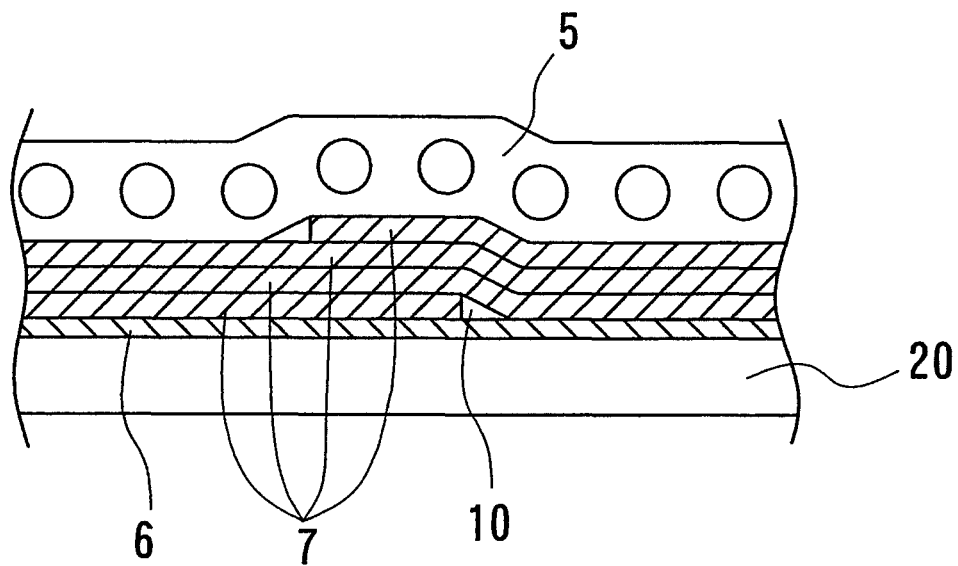
FIG. 3 is a partial magnified cross-sectional view of a splice part formed in the making step using the drum included in the process of manufacturing a pneumatic tire according to an embodiment of the present invention, the splice part being viewed in the axial direction of the drum.
Figure 4:
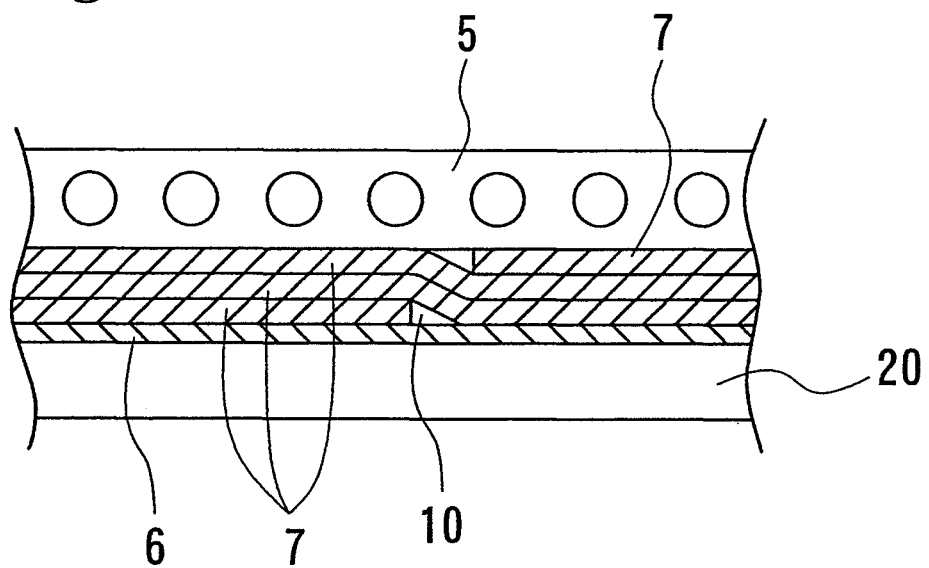
FIG. 4 is a partial magnified cross-sectional view of a splice part formed in a making step using a drum included in a process of manufacturing a pneumatic tire according to another embodiment of the present invention, the splice part being viewed in the axial direction of the drum.

In the case of the manufacturing process according to the present invention, no specific restriction is imposed on the locations of the two respective end portions of the rubber sheet member thus wound. As shown in FIG. 3, the end of the rubber sheet member at which the winding starts and the other end of the rubber sheet member at which the winding ends may overlap each other. Otherwise, as shown in FIG. 4, the end of the rubber sheet member at which the winding starts and the other end of the rubber sheet member at which the winding ends may be set off from each other in the circumferential direction. Overlapping the two end portions of the rubber sheet member together makes it possible to tighten the splice part in the radial direction of the tire when the diameter of the secondary green tire is expanded or when the secondary green tire is molded by curing, and accordingly to decrease the displacement of the slice part in the circumferential direction. Setting the two end portions thereof off from each other makes it possible to form no step between the carcass layer 5 and the thermoplastic resin film 6, and accordingly to decrease the displacement of the locations of the two respective end portions of the rubber sheet member in the radial direction after the secondary green tire is made.

In the case of the manufacturing process according to the present invention, it is desirable that the splice part, or particularly the end of the uncured rubber sheet member 7 at which the winding starts, should be stitched after the uncured rubber sheet 7 is wound around the cylindrical thermoplastic resin film 6 covering the making drum 20. It is desirable that the splice part or the end of the uncured rubber sheet member 7 should be stitched particularly before the two end portions of the carcass layer 5 are folded back around the respective bead cores. Stitching makes it possible to expel air enclosed in the step in the splice part of the uncured rubber sheet member, and accordingly to reduce the air pocket in size. In addition, it is desirable that the splice part of the rubber sheet member, or particularly the end of the rubber sheet member at which the winding starts, should be stitched after the secondary green tire is made, as well. Stitching after the secondary green tire being made makes it possible to reduce the air pocket in size further.

In the case of the manufacturing process according to the present invention, no specific restriction is imposed on the rubber compositions of which the uncured rubber sheet member is made, as long as the rubber compositions are the same as those currently used as the materials for tires. The rubber composition may be obtained using material by adding compounding ingredients. The materials used are such as: diene rubbers such as NR, IR, BR and SBR; an ethylene-propylene co-polymer rubber; and a styrene elastomer. Compounding ingredients are such as carbon black, a process oil and a curing agent.

The desirable cylindrical thermoplastic film is the one that a thermoplastic resin composition is formed as a monolayered or multilayered cylindrical thermoplastic resin film by a general extruding method, for example, by an inflation molding method. No specific restriction is imposed on the resin used to form the cylindrical thermoplastic resin film, as long as the resins can be melt-molded. It is desirable that the resin should be, for example, a thermoplastic resin such as a polyamide resin, a polyester resin, a polynitrile resin, a polymethacrylate resin, a polyvinyl resin, or a resin composition essentially containing these thermoplastic resins. It is desirable that the resin composition should be a thermoplastic resin composition in which the above-mentioned thermoplastic resin is formed as matrix whereas an arbitrary elastomer component is formed as a domain. It is desirable that such an elastomer should be an olefin elastomer, a styrene elastomer or the like.

The present invention exerts its effects particularly on the production of heavy-duty tires whose tie rubber layer needs to be constructed thicker. It goes without saying that the present invention is applicable to the production of any other types of pneumatic tires for the purpose of reducing blisters.

Descriptions will be provided hereinbelow for the present invention by citing its examples. It should be noted that the scope of the present invention shall not be limited by these examples.

EXAMPLES

Examples 1 and 2 as Well as Conventional Example

Common conditions applied to Examples 1 and 2 as well as Conventional Example were as follows. The tire size was 11R22.5; the configuration shown in FIG. 1 was used as the tire structure; the total thickness of the rubber sheet member wound around the cylindrical thermoplastic resin film (with a thickness of 0.2 mm) working as the air permeation preventive layer was set at 1.5 mm; the two end portions of the rubber sheet member were spliced together with an overlap; a primary green tire was made with these conditions; subsequently, a secondary green tire was made by expanding the diameter of the primary green tire; and the secondary green tire was molded by curing at a mold temperature of 150° for a curing time of 45 minutes. By changing the thickness of the rubber sheet member and the number of winding as shown in FIG. 1, each of Examples 1 and 2 as well as Comparative Example was evaluated in terms of the air pocket size, whether or not the thermoplastic resin film comes off from the rest of the tire, and whether or not blisters were caused on the thermoplastic resin film after curing.

[Measurement of the Size of the Air Pocket]

With regard to the air pocket formed in the end of the rubber sheet member at which the winding started in the center of the tread part, as the size of the air pocket, the maximum lift length in the circumferential direction of the tire in the inner surface of secondary green tire was measured through the translucent thermoplastic resin film.

[Evaluation of Whether or not the Thermoplastic Resin Film Comes Off]

The secondary green tire was left at room temperature for hours after the secondary green tire was made. Thereafter, the secondary green tire was evaluated in terms of whether or not the thermoplastic resin film is separated or comes off from the rest of the secondary green tire.

[Evaluation of Whether or not Blisters Are Caused]

The pneumatic tire thus molded by curing was visually evaluated in terms of whether or not blisters were caused on the inner surface of the tire.

TABLE 1

|  | Conventional Example | Example 1 | Example 2 |
|---|---|---|---|
| Thickness of Rubber Sheet Member | 1.5 mm | 0.75 mm | 0.5 mm |
| Number of Winding of Rubber Sheet | Once | Twice | Three Times |
| Size of Air Pocket | 5 mm | 3 mm | 2 mm |
| Whether or not the Thermoplastic Resin Film Comes off | Came off | Did not come off | Did not come off |
| Whether or not Blisters Are Caused | — | No | No |

What is claimed is:

1. A process of manufacturing a pneumatic tire, including:
    covering a making drum with a cylindrical thermoplastic resin film;

winding an uncured rubber sheet member as a tie rubber around the thermoplastic resin film, wherein the uncured rubber sheet member is made of a composition that includes carbon black; and winding a carcass layer around the rubber sheet member, wherein the rubber sheet member is wound in the circumferential direction of the tire at least twice, such that the lowest layer of the rubber sheet member is in contact with the thermoplastic resin film and an upper layer of the rubber sheet member is wound around the full width of a lower layer of the rubber sheet member without displacing the position of the upper layer with respect to the width direction of the pneumatic tire, wherein the thickness of the rubber sheet member is 0.2 mm to 1.0 mm, and wherein the total thickness of the multiple wound rubber sheet member is 0.4 mm to 5.0 mm.

2. The process of manufacturing a pneumatic tire as recited in claim 1,
wherein one end of the rubber sheet member at which the winding starts and the other end thereof at which the winding ends are set off from each other in the circumferential direction thereof.

3. The process of manufacturing a pneumatic tire as recited in claim 1,
wherein the end of the rubber sheet member at which the winding starts is stitched.

4. The process of manufacturing a pneumatic tire as recited in claim 1,
wherein the pneumatic tire is a heavy-duty pneumatic tire.

5. A process of manufacturing a pneumatic tire, including:
covering a making drum with a cylindrical thermoplastic resin film;

winding an uncured rubber sheet member as a tie rubber around the thermoplastic resin film, wherein the uncured rubber sheet includes two end edge portions and two side edge portions, thereby defining a width between the two side edge portions, wherein the uncured rubber sheet member is made of a composition that includes carbon black; and winding a carcass layer around the rubber sheet member, wherein the rubber sheet member is wound in the circumferential direction of the tire at least twice, such that the lowest layer of the rubber sheet member is in contact with the thermoplastic resin film and an upper layer of the rubber sheet member is wound around the full width of a lower layer of the rubber sheet member, such that both of the end edge portions extend the full width of the wound uncured rubber sheet, wherein the thickness of the rubber sheet member is 0.2 mm to 1.0 mm, and wherein the total thickness of the multiple wound rubber sheet member is 0.4 mm to 5.0 mm.

6. The process of manufacturing a pneumatic tire as recited in claim 5,
wherein one end edge portion of the rubber sheet member at which the winding starts and the other end edge portion thereof at which the winding ends are set off from each other in the circumferential direction thereof.

7. The process of manufacturing a pneumatic tire as recited in claim 5,
wherein the end edge portion of the rubber sheet member at which the winding starts is stitched.

8. The process of manufacturing a pneumatic tire as recited in claim 5,
wherein the pneumatic tire is a heavy-duty pneumatic tire.

\* \* \* \* \*